(No Model.)
J. W. DRUMMOND.
MEANS FOR ROASTING COFFEE.
No. 260,672. Patented July 4, 1882.
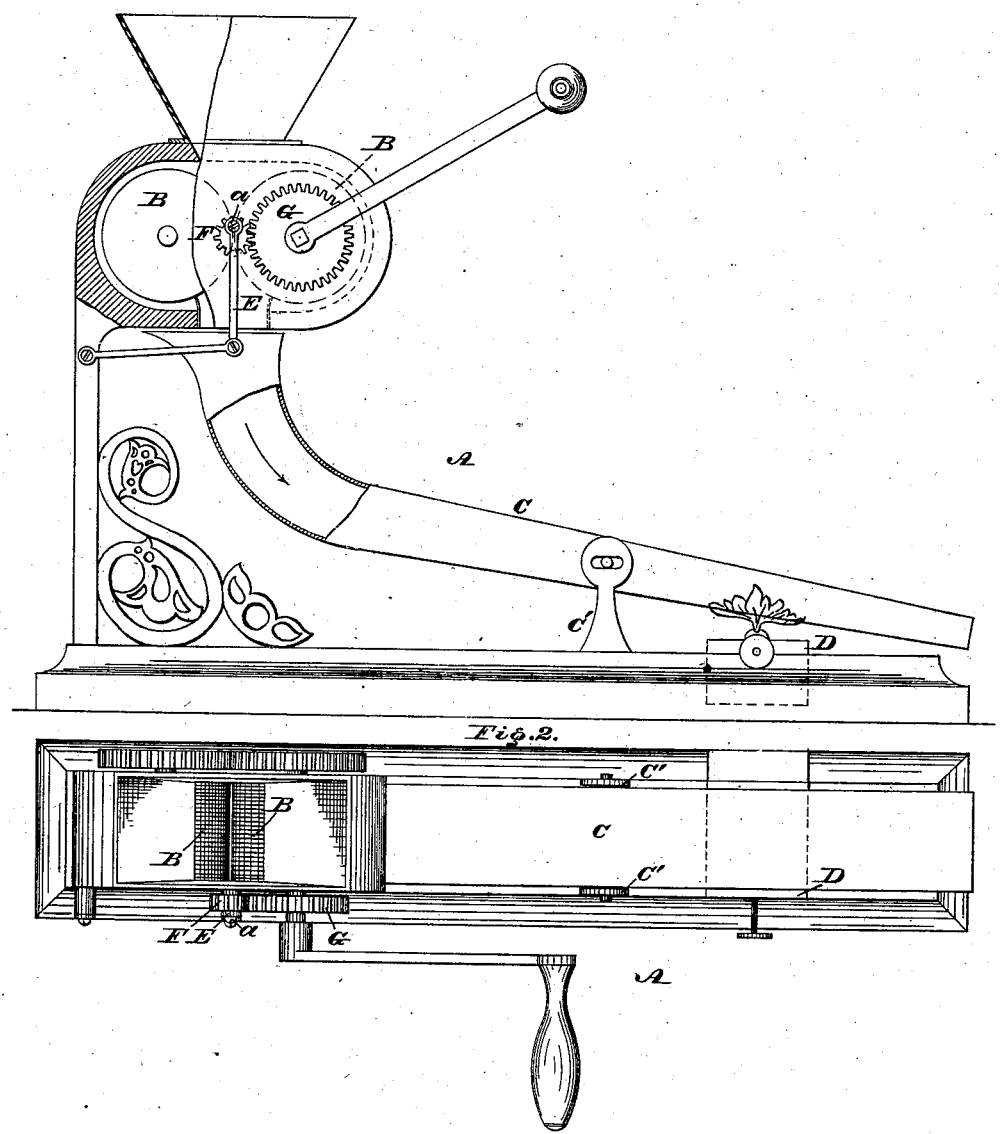
WITNESSES:
INVENTOR: John W. Drummond,
ATTORNEY.

UNITED STATES PATENT OFFICE.

JOHN W. DRUMMOND, OF PHILADELPHIA, PENNSYLVANIA, ASSIGNOR TO FRANK STEVENS, OF SAME PLACE.

MEANS FOR ROASTING COFFEE.

SPECIFICATION forming part of Letters Patent No. 260,672, dated July 4, 1882.

Application filed April 13, 1882. (No model.)

*To all whom it may concern:*

Be it known that I, JOHN W. DRUMMOND, a citizen of the United States, residing in the city and county of Philadelphia, State of Pennsylvania, have invented a new and useful Improvement in Means for Roasting Coffee, which improvement is fully set forth in the following specification and accompanying drawings, in which—

Figure 1 is a side elevation, partly broken away, of a coffee mill and roaster embodying my invention. Fig. 2 is a top or plan view thereof.

Similar letters of reference indicate corresponding parts in the two figures.

The invention consists of a combined coffee mill and roaster, whereby the coffee is crushed and directed to the roaster, leaving which it is ready for use.

Referring to the drawings, A represents a coffee-mill having suitable crushing burrs or cylinders, B, which are geared together, and operated by hand or power, as desired.

C represents a vibrating tube, which is open at both ends, and has a horizontal axis on standards C'. The front part of the tube is curved or bent upwardly, and has its mouth under the discharge-spout or discharge portion of the mill, whereby the material crushed by the mill falls into the tube.

D represents a heating device or apparatus, which may be of the form of a lamp, furnace, &c., so arranged that the flame or products of combustion impinge against or envelop a portion of the tube and highly heat the same.

In order to cause the vibrating or shaking motion of the roasting-tube C, I employ an arm, E, which is pivoted at one end to said tube and attached at the other end to a wrist or crank pin, *a*, on a pinion or toothed wheel, F, which is properly mounted on the casing or frame of the mill, and meshed with a toothed wheel, G, which is secured to the shaft of one of the cylinders B.

It is evident that the arm may be connected to a yoke which encircles an eccentric whose bearing is on one of the shafts of the mill, and other means may be adopted for vibrating the tube.

Coffee in a green state is placed in the hopper of the mill, and as it passes between the burrs or cylinders B it is crushed, in which condition it drops into the tube C and is passed through the same, whereby it is roasted, it being noticed that the vibration of the tube imparts motion to the crushed coffee, so that it is sufficiently agitated and turned as it travels through the tube, and thus the roasting is properly accomplished.

It will be seen that as the coffee is roasted after being crushed the roasting is thorough and uniform. By this provision, also, of roasted particles of green coffee, the aroma, in making coffee, is properly evolved, thus producing a superior beverage; and as the coffee is ready for use as it leaves the roaster, and may be immediately placed in the coffee pot or machine, there will be but little or no loss of aroma after the coffee leaves the roaster, it being evident that only the quantity of coffee required each time may be crushed and roasted, as the roasting of the coffee, after being crushed or reduced to particles, is quickly accomplished.

The special method of roasting coffee after being ground or crushed in a green condition may be the subject of another application.

Having thus described my invention, what I claim as new, and desire to secure by Letters Patent, is—

1. A coffee-mill, in combination with a roaster which communicates with the discharge portion of said mill by a suitable passage, substantially as and for the purpose set forth.

2. A coffee-mill, in combination with a roaster consisting of a vibratory passage, into which said mill discharges, and a calorific device operating on said roaster, as set forth.

3. A coffee-mill, in combination with a roaster provided with shaking or vibrating devices which are operated by the action of the mill.

4. A coffee-mill consisting of two crushing burrs or cylinders and operating devices therefor, in combination with a conveying-tube and a roaster provided with a heating device, substantially as set forth.

5. The coffee-mill supported upon standards erected on a suitable base, in combination with a roaster which is also supported on said base, combined and operating substantially as set forth.

6. The mill A, vibrating tube C, arm E, and heating device D, combined and operating substantially as described, and forming an improvement in combined coffee mills and roasters, as stated.

JOHN W. DRUMMOND.

Witnesses:
RICHARD C. FINN,
GEO. W. HANCOCK.